Figure 1:
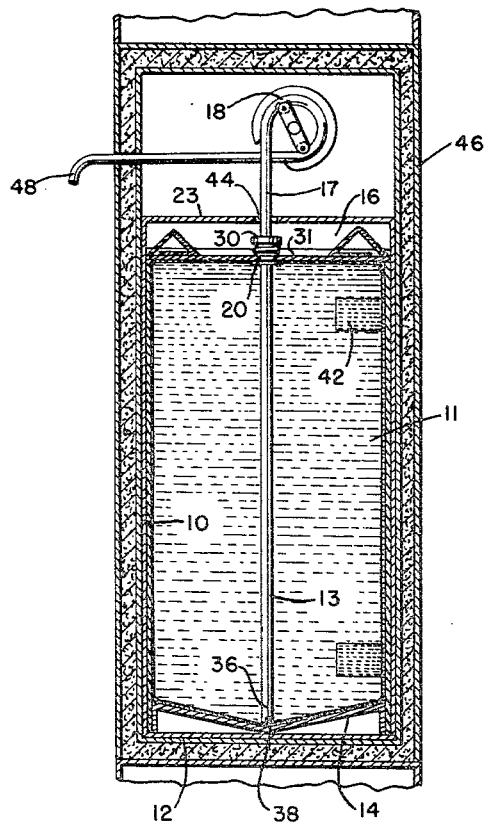

March 2, 1965  P. J. DANIELS  3,171,571
BEVERAGE DISPENSER
Filed March 8, 1963

INVENTOR.
PAUL J. DANIELS
BY
ATT'Y.

3,171,571
BEVERAGE DISPENSER
Paul J. Daniels, Niles, Mich., assignor, by mesne assignments, to The Bastian-Blessing Company, Chicago, Ill., a corporation of Illinois
Filed Mar. 8, 1963, Ser. No. 263,802
9 Claims. (Cl. 222—94)

This invention relates generally to fluid dispensers and more particularly to an improved dispensing system and container which stores and maintains liquids free of contamination and which is emptied by pressure differential between opposite sides of a sealed flexible wall of the container induced either by suction withdrawal or externally applied pressure.

By way of illustrating the invention which can be used with various drinks, including milk products, juices, syrups, etc., the invention is described in connection with the dispensing of milk which is maintained in an absolutely sanitary condition in an original container with minimal air therein from the time the container is filled until it is emptied.

Heretofore milk has been handled in varying quantities in metal milk cans, small glass bottles or coated cardboard cartons and although the present invention may find embodiments in liquid containers of all sizes, it is primarily of interest in replacing multiple gallon metal milk cans with a light, single-use, disposable container as part of a system for intermittently dispensing milk and other liquids in measured amounts over a period of time. The rectangular cardboard containers have about 20% greater capacities than comparable round metal milk cans.

Heretofore, efforts have been made to fill a sealed plastic bag with milk where it is free to fill out to full size without any folds developing and then insert it into a corrugated board container for handling. Although this avoids difficulties experienced with folds that have developed in the bag, insertion often causes tears and leakage which are not detected until later. After filling the bag is conventionally stoppered at the bottom for dispensing milk by gravity as desired and the bag progressively collapses in complex folds as the milk is withdrawn. The irregular folds trap milk with some waste primarily because no pressure differential is provided to flatten the folds of the bag for complete evacuation and secondarily because trapped milk cannot flow from closed irregular pockets even if some pressure was present.

In the present invention means are provided in which the empty bag and container are preassembled in a predetermined relationship, the bag is then filled from the top in presupported relation without wrinkles developing. The filling is done through an opening that is thereafter closed with a closure having a liquid eduction tube extending therethrough to the bottom of the container. A flexible tube triple seals the eduction tube and the container each from the atmosphere and also the flexible tube from the container except through the eduction tube. The eduction tube is preferably flexible and may be provided with an end insert if desired. The tube extends to the bottom of the container at the center where it rests on the bottom and in combination with the container serves as a stretching device to prevent the bag from collapsing in a heap a the bottom of the container when the milk container is empty. Instead, the bag folds around the eduction tube and flattens in a horizontal direction. The last few drops of liquid can thereby be evacuated with the bag collapsing completely without trapping any milk any place out of contact with the inlet at the bottom of the eduction tube and this is true regardless of whether syphon or pressure differential evacuation is employed.

The free end of the flexible tube is sealed with a closure plug until ready to dispense milk, at which time it is placed in a dispensing mechanism and the closure is removed after tube is in dispensing position to insure cleanliness and permit milk to be withdrawn.

Figure 2:
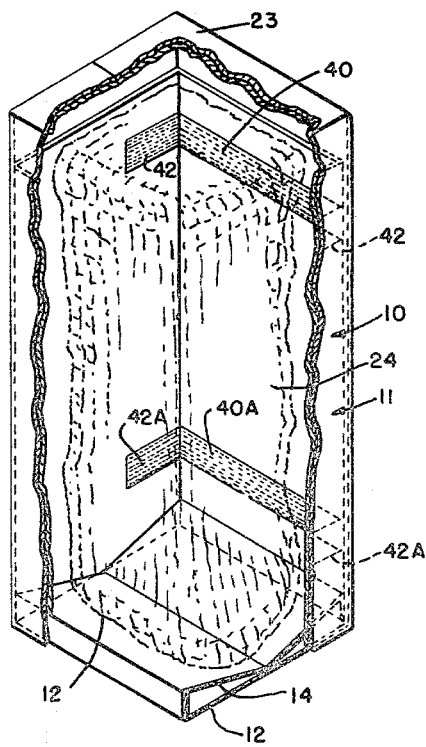
Figure 5:
Figure 6:
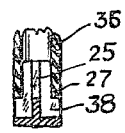
Figure 3:
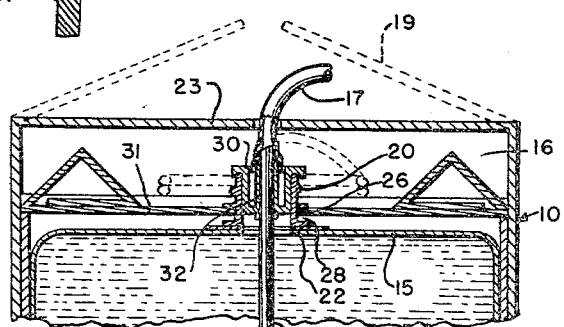
Figure 4:
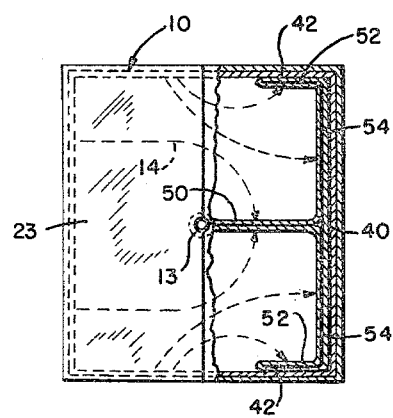

The invention is illustrated in conjunction with the drawings herein in which:

FIG. 1 is a vertical sectional view of a package and a dispenser device illustrating the invention, FIG 2 is a perspective view partly broken away showing the package embodying the invention, FIG. 3 is an enlarged sectional view of the top of the package where the top of an eduction tube is disposed, FIG. 4 is a horizontal section showing the shape and position assumed by the bag in the container after the liquid has been withdrawn to a level below the point of the section, FIG. 5 is an enlarged sectional view of dispensing end of the eduction tube as sealed before being put into operation, and FIG. 6 is an enlarged sectional view of the intake end of the eduction tube.

Referring now to the drawing in further detail, a sturdy water-proofed corrugated container 10 is shown which provides complete protection to a package of milk 11 supported therein under all normally expected conditions of refrigeration, shipping and handling. The package includes a flexible polyethylene bag 24 completely heat sealed.

On the bottom 12 the container is provided with a shallow V-shaped trough 14 construction which provides a slight pitch to the center and drains all liquid to a central low area. At the top an enclosed recess 16 is provided to store the coils of a flexible tube 17 connected to the upper end of the eduction tube 13 and which serves in connection with a sanitary lift 18 to educt the milk. The lift 18 is diagrammatically shown but depicts a housing 18*h* in which the tube 17 is internally wound where it is progressively collapsed cyclically by rollers 18*r* against the housing in their bodily rotation to draw liquid through the tube from the package 11 behind them and force the liquid out of the tube 17 ahead of them as more particularly described in my earlier Patents No. 2,695,117, and 2,955,543, reference to which is hereby made. When flap 19 is lifted, the tube can be unreeled and installed in the lift pump housing as shown.

At the filler-eduction opening a plastic sleeve 20 serves as a filler neck secured as an integrated unit therewith in an opening 22 in the top 15 of the bag 24 and is circumferentially grooved as at 26 to lock in supported relation in a slot 28 on an upper or subwall 31 in the container 10 at the bottom of the recess. The sleeve is conformed internally to receive a conventional filling machine nozzle (not shown) which when removed after a filling and weighing operation is replaced with a cup shaped plug 30 that snaps rather permanently into the filler opening to close it. The plug 30 has an upstanding nipple 32 disposed concentrically therein which supports the upper end of the depending eduction tube 13 in frictionally sealed realtionship. The lower end 36 of the tube 13 is inserted through the sleeve 20 ahead of the plug 30 and when the plug is snapped into place the lower end of the tube extends to the bottom of the trough 14 where it receives an insert (FIG. 6) having three radial support vanes 25 shouldered at 27 for limiting the depth of insertion in order to provide lateral intake openings 38 for the removal of milk at the lowest point in the container which in this case is the trough 14.

The upper end of the tube preferably extends a short distance above the nipple 32 where it receives the rubber tube 17 that is slipped down over the upper end of the tube 13 and over the upper end portion of the nipple to seal not only against the tube but also to seal the space between the tube 13 and nipple 32, and seal both against any air entering the bag 24 under pressure differentials developed to evacuate the milk. Then, after the unitary assembly of the plug, the eduction tube and the rubber tube, the assembly is snapped into place; the free end of the tube 17 which is terminally closed by an insert plug 31 (FIG. 5) having a skirt 33 protecting the end portion of the tube 17 against contamination and leakage; the tube 17 is then coiled into the recess 16; and, the cover flap 19 of the container is closed to ready the package for shipment.

For purposes of holding the bag in position for proper expansion in the container without wrinkles when it is being filled and emptied, pressure sensitive adhesive areas are applied on three sides of the container near the top. One area 40 extends the full width of one side wall. The other two 42, extend from the ends of area 40 a distance along the adjacent walls preferably a little less than one-half the width of the respective side walls. These adhesive areas may be repeated at vertically spaced levels but one group near the top and possibly another group near the bottom 40A and 42A will suffice.

The bags 24 come folded flat generally without bellow sides. The bag is laid at proper elevation against the side of the container having the adhesive area 40 thereon either before the container 10 is erected or after the container is erected from its flattened form. The loose material of the bag is then moved sidewise to bring an appropriate part of the bag 24 against the pressure sensitive area of 42 one side wall for adhesion hereto and then moved in the opposite direction to bring another appropriate portion of the bag into contact with the other pressure sensitive area 42. This partially unfolds the bag in supported relationship over a U-shaped portion and if the container 10 has not been erected as yet, it can then be erected and the sleeve 20 located in place on the top wall where it is readily available without any air having been drawn into the bag. Thereafter when the container is placed on its bottom 12 on a filling scales (not shown) with the filler sleeve 20 at the top, the bag is already shaped out over approximately ½ of the side wall area of the container with little or no air in the bag 24.

As the milk pours into the bag 24 inside the container 10, it begins to push out the rest of the bag against the remaining side wall areas of the container 10 ahead of the rising filling level and flatten the bottom of the bag against the inclined trough construction 14 without any significant wrinkles developing in the bag. Thus, the bag 24 is completely expanded against the side wall area and bottom 12 of the container without any significant wrinkles and a full measure of milk completely fills the bag. Thereafter the eduction tube 13, closure 30 and hose 17 assembly is inserted into place as already described with the coiled tube coil reposing in the recess 16 and the container 10 sealed at the top 23.

When the container is placed in a dispensing machine of the type described, the upper end 23 of the container 10 is opened, the tube 17 is uncoiled and the upper end again closed with the tube extending through a suitable opening 44 provided for that purpose. The container is moved into dispensing position in a refrigerated cabinet 46 and the tube 17 is installed in the pump 18 between the housing 18*h* and rollers. The free end of the tube is then brought to a milk dispensing station at 48 and the last act is to unseal the end of the tube by removing the plug 31 just before the dispensing operation is started. Thereby sanitation is assured under all conditions.

Thereafter the milk is intermittently drawn from the bag 24 by the lift 18 under inside vacuum-like conditions which utilizes atmospheric pressure on the outside of the bag 24 to collapse the bag as it is progressively emptied of milk. The progressive collapse of the bag 24 under this pressure differential proceeds from the top down with the unattached bag portions opposite the adhesive areas 40 and 42 folding around the tube 13 and against each other as at 50 (FIG. 4) beyond the tube and also against the portions of the bag which are adhered to the container as shown in FIG. 4 at 52 and 54 with progressive advancement as shown by broken line arrows. The tube 13 thus performs a multiple function in that it not only evacuates the milk but it also reduces the pressure inside the bag with respect to atmospheric pressure outside and the atmospheric pressure collapses the bag to a form in which no folds are present which might trap milk.

It is of interest to note that this collapse of the bag in an orderly predetermined manner can be accomplished without a lift pump, if desired, merely by locating the container 10 in a refrigerating compartment which can be pressurized above atmospheric pressure a pound or two per square inch which pressure would be enough to lift the milk from the bottom of the eduction tube 13 and move it through the tube to the dispensing port 48. For instance, if the container is 24 inches high, the applied pressure should exceed 24 inches of water column by a few inches of pressure.

In both of these dispensing systems the liquid is squeezed along between the walls which are flattened together with sufficient pressure to force all liquid from between them. Under such circumstances the milk would flow by gravity to the bottom 12 of the bag 24 where it would quickly reach the eduction inlet 38 of the tube 13.

In those instances where a flavored syrup is dispensed without a pump as where it is forced by external gauge pressure to flow out of a valve nozzle (not shown), the container 10 can be a sealed stainless steel receptacle in which the bag is located in sealed relationship. Then when the container is pressurized, the collapsing side walls of the bag force the syrup up and out of the eduction tube and completely evacuate the bag by collapsing the bag against the container side walls and tube as already described.

Thus it will be observed that various advantages and results are present with the invention that are novel over those present in conventional dispensing equipment and it will also be observed that various modifications and changes can be made in a container and the bag to accommodate pressures and vacuum conditions as desired without departing from the spirit of the invention the scope of which is commensurate with the appended claims.

What is claimed is:

1. A package for liquid comprising a rectangular container having rigid end and side walls, a tubular bag having flexible walls supported in the container to rest against the container side walls, a liquid eduction tube disposed within said bag and spaced from said container side walls, means supporting the tube and one end of the bag in sealed relationship with respect to each other upon one container end wall, and means for adhering the flexible walls to contiguous container side walls in supported relation over more than a quarter and less than one-half the girth of the package defined by said container side walls said flexible walls being supported to collapse around the tube in an orderly manner during liquid eduction.

2. A package for liquid comprising a container having rigid end and side walls, a bag having flexible walls supported in the container to rest against the container side walls, a liquid eduction tube disposed within said bag and spaced from said container side walls, sleeve and plug means supported on one of said container end walls for supporting the tube and bag in sealed relation with respect to each other upon said one end wall, adhesive means supporting a side wall segment of the flexible walls upon a continuous portion of the side walls over more than a quarter and less than one-half the girth defined by said container side walls, means for removing the liquid within the bag by inducing a pressure differential lower in the bag than outside the bag to induce flow of the liquid from the bag and effect an orderly collapse of the bag around said tube and towards said adhesive means.

3. A package for potable liquids comprising a container having rigid side walls, a bag having flexible walls supported in the container to rest against the container side walls, a liquid eduction tube centrally disposed within said bag and spaced from said container side walls and opening at the bottom of the bag, adhesive means for supporting a side wall segment of the flexible walls upon a continuous portion of the container side walls extending more than a quarter and less than one-half the girth defined by said container side walls, and means for collapsing the remainder of the side walls of said flexible walls around said tube and against said side wall segment in an orderly manner with educting liquid through said tube, the remainder of said girth forming a continuous portion acting to support the flexible walls during the eduction of the liquid from the bag.

4. A milk package comprising a rectangular corrugated container having a slightly pitched bottom, a top wall, side walls and a subwall defining a recess behind the top wall, a sealed bag substantially filling the container when filled with milk and having a single inlet sleeve element at the top supported on said subwall, a liquid eduction tube supported at its upper end on said sleeve in sealed relationship therewith and extending down to said pitched bottom, a flexible hose secured in sealed communication with the upper end of said tube and stored in said recess, and adhesive means for securing in supporting relationship a side wall segment of the bag that is less than one-half of the girth of the bag on the side walls of the container over a distance greater than a quarter of the girth of said container and spaced from said eduction tube, said eduction tube and said adhesive supporting means acting to guide the orderly collapse of the sealed bag as the milk is educted.

5. A milk package comprising a rectangular corrugated container having a slightly pitched bottom, a top wall, side walls and a subwall defining a recess behind the top wall, a sealed bag substantially filling the container and having an inlet sleeve element at the top supported on said subwall, a liquid eduction tube supported at its upper end on said sleeve in sealed relationship therewith and extending down to said pitched bottom, a flexible tube secured in sealed communication with the upper end of said eduction tube and stored in said recess, adhesive means for securing in supporting relationship a side wall segment of the bag on the side walls of the container over a distance greater than a quarter of the girth of said container and spaced from said eduction tube, and lift means for repeatedly and continuously compressing said flexible tube progressively along a portion of its length and maintaining said compression to induce a pressure differential lower in the bag than outside of the bag to induce flow of liquid from the bag out through the flexible tube, said eduction tube and said adhesive supporting means acting to guide the orderly collapse of the sealed bag as the pressure within the bag is lowered and the milk is educted.

6. A package of potable liquid comprising a rectangular container having side walls and a bottom wall defining a low point, an upper wall, a sealed bag having flexible walls substantially filling the container and having an inlet element at the top in sealed relationship with the bag, means for supporting said inlet element on said upper wall, a liquid eduction tube supported at its lower end on said bottom wall at said low point, a flexible tube secured in sealed communication with the upper end of said eduction tube and stored on the upper wall, adhesive means for supporting a side wall segment of the flexible walls upon a continuous portion of the container side walls over more than a quarter and less than one-half the girth defined by said container side walls, means for removing the liquid within the bag by inducing a pressure differential lower in the bag than outside the bag to induce flow of the liquid from the bag and effect an orderly collapse of the bag in cooperation with said tube and said adhesive means.

7. A package for liquid comprising a container having rigid side walls, a bag having flexible walls resting against the container side walls and a single opening, a filler-eduction sleeve secured as an integrated unit with said bag in said opening, a plug received in said sleeve in sealed relationship and having an externally extending nipple, a liquid eduction tube disposed within said bag and extending from the bottom of the container in spaced relationship with the side walls thereof through and beyond said nipple in telescoping relationship therewith, a flexible tube received over said nipple and eduction tube in sealed engagement with both independently and cooperative to seal the bag from outside contamination of the bag, means for inducing a pressure lower in the bag than outside the bag to induce flow of liquid from the bag out through the flexible tube including measuring means for metering the flow of liquid through the flexible tube, the flexible walls collapsing around the tube in an orderly manner during said flow of liquid.

8. A package for liquid comprising a rectangular waterproofed corrugated container having rigid end and side walls, a tubular polyethylene bag having initially collapsed flexible walls resting against the container side walls, means for adhering the flexible walls to contiguous side walls in supported relation over more than a quarter and less than one-half the girth of the package defined by said container side walls, said bag having only one opening constituting a filler-eduction opening at an end wall of the container, filler means secured in said opening for supporting said bag at said opening on said end wall, and continuously sealed eduction means connected to said filler means when said bag is filled including an eduction tube disposed within said bag in spaced relation to the container side walls and terminating adjacent to the other end wall, to effect an orderly collapse of the flexible side walls around the tube during eduction of liquid from the bag.

9. A package for liquid comprising a rectangular container having rigid side walls, top and bottom end walls and a subwall below the top end wall defining with the top wall a recess, a tubular bag having flexible walls supported in the container to rest against the container side walls and having a single opening at the top thereof, a filler-eduction sleeve secured as an integral unit with said bag in said opening and supporting the top of the bag upon the subwall of the container, a liquid eduction tube disposed within said bag and extending from the bottom of the container to said sleeve in spaced relationship with the container side walls, means supporting the eduction tube on the sleeve including a plug receivable permanently in said sleeve in sealed relationship and having an externally extending nipple in telescoping relationship with said eduction tube, a flexible tube normally stored in said recess and supported on said nipple in sealed relationship with said eduction tube and cooperating to seal the bag from outside contamination, means for inducing a sub-atmospheric pressure in the bag with atmospheric pressure effective outside the bag to induce flow of liquid from the bag out through the eduction tube and flexible tube and effect an orderly collapsing of the flexible walls in a horizontal direction around said eduction tube progressively downwardly from the subwall, said inducing means including a measuring means for metering the flow of liquid through the flexible tube.

References Cited by the Examiner

UNITED STATES PATENTS

| | | | |
|---|---|---|---|
| 313,077 | 3/85 | Hudson | 222—464 X |
| 1,735,915 | 11/29 | Bent. | |
| 2,618,409 | 11/52 | Eisenberger et al. | 222—95 |
| 2,695,117 | 11/54 | Daniels | 222—164 X |
| 2,978,144 | 4/61 | Rilinger et al. | 222—95 |
| 3,001,673 | 9/61 | Brown | 222—107 |
| 3,143,249 | 8/64 | Merrill | 222—105 |

OTHER REFERENCES

The Condensed Chemical Dictionary, 6th edition, Reinhold Publishing Corporation, copyright 1961, page 911.

EVERETT W. KIRBY, *Primary Examiner.*

LOUIS J. DEMBO, RAPHAEL M. LUPO, *Examiners.*